United States Patent Office

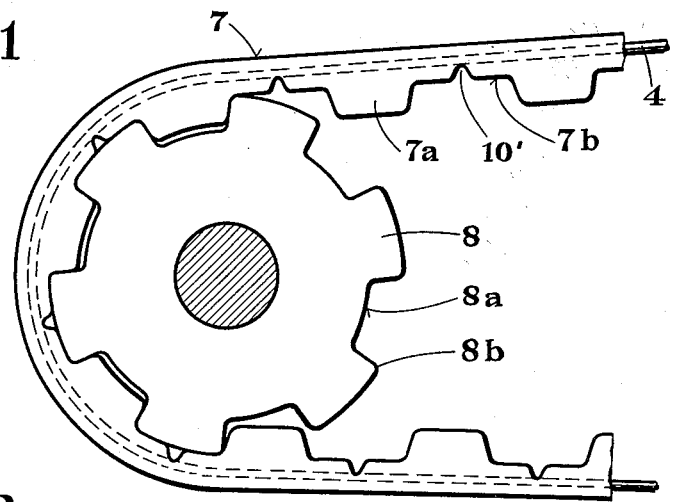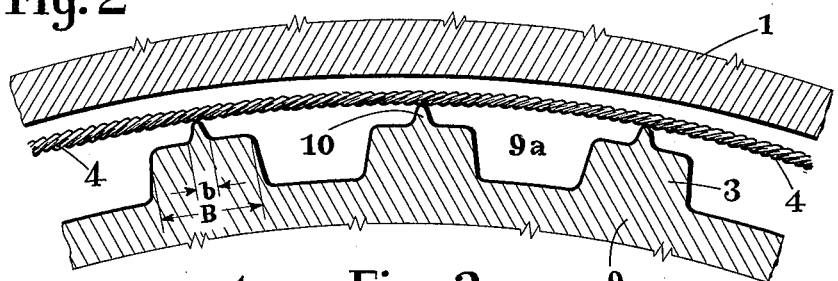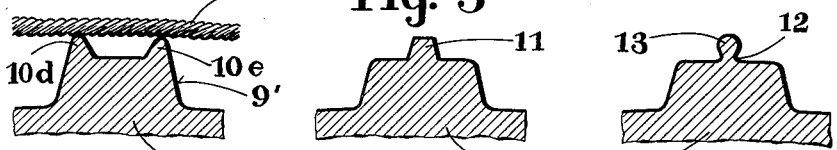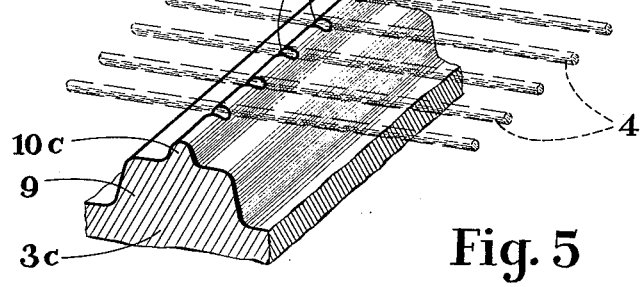
INVENTOR:
Heinz Adolf Ludewig

3,103,703
Patented Sept. 17, 1963

3,103,703
MOLD FOR PRODUCING FLEXIBLE BELTS
WITH TEETH
Heinz Adolf Ludewig, Hannover, Germany, assignor to Continental Gummi-Werke Aktiengesellschaft, Hannover, Germany
Filed Mar. 27, 1957, Ser. No. 648,914
Claims priority, application Germany Apr. 5, 1956
5 Claims. (Cl. 18—36)

The present invention relates to a mold for producing flexible belts with teeth of elastic synthetic materials or the like with an outer annular mold and an inner concentrically arranged mold in form of a mandrel having its peripheral surface provided with teeth-like elevations.

According to assignee's co-pending application No. 369,272 filed July 21, 1953, belts of the above mentioned type are poured into a mold comprising an annular member and a mandrel provided with teeth arranged in said annular mold member in such a way that the surfaces of said annular member and mandrel facing each other form the mold chamber proper. In order to limit the possible extension of the belt, reinforcements in form of wires and the like are inserted into said mold chamber while said reinforcements are held within the mold by fixed abutments until the belt material which is placed into the mold in liquid condition has solidified.

With the mold according to assignee's above mentioned copending application No. 369,272, the said fixed abutments are formed by rods extending through the mold chamber proper and having a relatively small diameter. According to another embodiment of the mold according to assignee's co-pending application No. 369,272, fabric layers are placed upon the smooth peripheral surface of the mandrel and serve as support for the reinforcing inserts.

It is an object of the present invention further to improve and simplify the support for the reinforcing inserts in the mold.

It is another object of this invention to provide an improved simplified mold for flexible belts with teeth of elastic synthetic materials and the like, which will not only reduce the total cost of production of belts of the above mentioned type but will also materially increase the output thereof.

These and other objects and advantages of the invention will appear more clearly from the following specification in connection with the accompanying drawings, in which:

FIG. 1 diagrammatically illustrates a side view of a belt drive having a belt provided with teeth in conformity with the present invention and passing over a correspondingly shaped pulley.

FIG. 2 diagrammatically represents a section through a portion of a mold according to the present invention for producing a belt as shown in FIG. 1.

FIGS. 3 to 6 diagrammatically represent further modifications for those elevated portions of the mandrel which serve as support for the reinforcements to be inserted in the belt to be produced.

*General Arrangement*

The mold according to the present invention, which comprises an annular outer mold member and a mandrel forming the inner mold member is characterized primarily in that the elevated tooth-like members of the mandrel which in the poured belt will form the tooth spaces are provided at the outer surfaces thereof with protrusions for supporting the reinforcing inserts. The said protrusions are such that their extension in circumferential direction of the mandrel is considerably less than that of the elevated portions of the mandrel for producing the tooth spaces of the belt. The said rigid protrusions which are firmly connected with the mandrel and act as support for the reinforcing inserts assure a precise location of the reinforcing inserts with regard to the mold chamber by which the cross section of the belt is determined.

In order to prevent premature destruction of the reinforcing inserts and the elastic layers surrounding the same, for instance due to fatigue, it is advantageous in conformity with a further development of the invention to round those surfaces of the protrusions which face the reinforcing inserts. It is furthermore advantageous in conformity with the invention to thicken those portions of the protrusions which face the reinforcing inserts in a bead-like manner and to round the thus created head along those surfaces which face the reinforcing inserts and also at the lateral portions of said protrusions.

*Structural Arrangement*

Referring now to the drawings in detail, FIG. 1 shows a belt 7 provided with teeth 7a and produced in conformity with the present invention, said teeth meshing with a pulley 8 having correspondingly shaped tooth spaces 8a and teeth-like protrusions 8b. The belt 7 is furthermore provided with reinforcing inserts 4 which may consist for instance of wire or wire strands and which are located in a transverse plane arranged in or approximately in the neutral zone of the belt.

The mold for producing the belt 7 comprises primarily an outer annular mold member 1 and an inner mold member for instance in form of a mandrel 3 the peripheral surface of which is provided with elevations 9 and depressions 9a corresponding to the desired tooth spaces 7b and teeth 7a of the belt 7 to be formed. For the sake of simplicity, only a portion of the inner and outer mold members is shown in FIG. 2. As will be seen from FIG. 2, the elevations 9 of the mandrel 3 are provided with protrusions or ridges 10 which are firmly connected to the mandrel 3 in any convenient manner and may be integral therewith. These protrusions or ridges extend substantially in the axial or transverse direction of the mandrel and serve as support for the reinforcing inserts 4. As has been clearly shown in FIG. 2, the extension of the protrusions or ridges 10 which according to FIG. 2 have an approximately triangular cross section is such that their width $b$ is considerably less than the width $B$ of the elevations 9. A very satisfactory ratio of the width $b$ to the width $B$ is about 1:3 to 5. It is, however, understood that this ratio is given merely as a ratio which has proved very satisfactory in practice and that other ratios will also be feasible.

The tips of the protrusions or ridges 10 are preferably rounded so that they will produce a correspondingly rounded depression 10' in the body of the molded belt 4, and that they will support the reinforcing inserts 4 at points only, in other words, the ridges are in point contact only with the respective reinforcing inserts which latter may consist of wires, thin wire strands and the like customary reinforcing inserts.

Instead of the triangular protrusions 10, also trapezoidal protrusions 11 may be employed as shown in FIG. 3 if contact of said protrusions with the reinforcing inserts along a larger supporting area is desired.

FIG. 4 shows a differently shaped protrusion which has a bead-like head 13 and is additionally rounded on its sides. This bead-shape of the protrusions 13 fully eliminates fractures of the belt due to fatigue.

A particularly advantageous shape of the protrusions according to the invention is shown in FIG. 5. In order to prevent any accidental lateral displacement of the reinforcing inserts 4, the protrusions 10c of FIG. 5 are provided with small notches 14 which extend in circumferential direction of the mandrel 3c, i.e. in the direction in which the reinforcing inserts 4 will extend when placed on the mandrel. It will be appreciated that in this way a precise spacing of the reinforcing inserts relative to each other will always automatically be assured.

While FIGS. 1 to 5 show each elevation 9, 9a, 9b and 9c respectively provided with one protrusion or ridge only, it is, of course, also possible to provide a plurality of protrusions on each elevation. Such an arrangement is shown for instance in FIG. 6 according to which the elevation 9d is provided with two protrusions or ridges 10d, 10e at each flank 9 thereof. According to FIG. 6, the outer lateral portions of the ridges 10e merge with the flanks 9'. However, this merging is, by no means necessary.

In order to produce a belt as shown in the drawings, the reinforcing inserts 4 are evenly and under a certain preload wound around the mandrel 3, 3c respectively. Thereupon the said mandrel is inserted into the outer mold 1 so as to occupy a position concentric therewith thereby creating the desired mold chamber proper for the belt. The synthetic belt material or the like is then poured into said mold chamber. As synthetic material for the belt, standard pourable synthetic materials may be employed as for instance polyurethanes or polyamides. After the poured material has solidified, the mold is opened and the belt is withdrawn from its mandrel. Depending on the width of the mold, the molded belt may also be cut along its longitudinal extension into a plurality of endless belts of less width.

As will be evident from the above, the mold according to the present invention makes it possible to produce belts with teeth of a maximum precision in a minimum of time inasmuch as the position of the reinforcing members is precisely fixed with regard to the toothed inner surface of the belt. In other words the spacing of the reinforcing inserts from the outer surface of the teeth is precisely fixed for all reinforcing inserts. The ridges or protrusions of the mold according to the invention do not yield when the reinforcing inserts are wound upon the mandrel and surprisingly do not affect the running properties and life of the belt by the corresponding recesses on the inner side of the molded belt. Due to the small width of the protrusions or ridges in comparison to the width of the tooth spaces of the belts, an elastic cushioning layer remains between the reinforcing inserts and the toothed pulleys cooperating with the belt. A buckling of the belt at the recesses produced by the said protrusions or ridges cannot occur since the belt is guided along those portions subjected to bending by the pulleys.

It is, of course, understood that the present invention is, by no means, limited to the particular constructions shown in the drawings but also comprises any modifications within the scope of the appended claims.

What I claim is:

1. A mold for producing flexible belts with teeth and reinforcing inserts from pourable material, which comprises: an outer mold member, and an inner mold member arranged for concentric positioning in and enclosure by said outer mold member, the periphery of said inner mold member being provided with alternate elevations and depressions corresponding to the tooth spaces and teeth of the belt to be produced, said inner and outer mold members when concentrically positioned confining a single substantially annular chamber between said outer mold member and the elevations and depressions of said inner mold member, those face portions of said elevations which in the assembled position of said mold members face the adjacent inner surface of said outer mold member, being provided with rigid ridge-like protrustions integral with said elevations, said protrusions extending substantially mid-way into said annular chamber and beyond the dedendum line thereof, said protrusions being substantially centrally located with respect to the face portions of said elevations, and extending in transverse direction of said inner mold member, the width of said protrusions measured in the direction of the planes in which the major surfaces of said inner mold members are located being considerably less than the width of the elevations pertaining thereto.

2. A mold for producing flexible belts with teeth and reinforcing inserts from pourable material, which comprises: an outer annular mold member having an inner smooth substantially cylindrical surface, and an inner mold member concentrically arranged in said outer mold member and having its peripheral surface provided with alternate tooth-like elevations and depressions in spaced relationship to said inner smooth surface of said outer mold member so as to form therewith a single substantially annular chamber having a contour in conformity with the tooth spaces and teeth respectively of the belt to be produced, those face portions of said elevations which in assembled position of said mold members face the adjacent inner surface of said outer mold member being provided with rigid ridge-like protrusions integral with said elevations, said protrusions extending substantially midway into said annular chamber and beyond the dedendum line thereof, said protrusions being substantially centrally located with respect to the face portions of said elevations, and having their longitudinal extension in the direction of the central axis of said inner mold member, and having a width considerably less than the width of the elevations pertaining thereto.

3. A mold for producing flexible belts with teeth and reinforcing inserts from pourable material, which comprises: an outer mold member, and an inner mold member arranged for concentric positioning in said outer mold member and for enclosure thereby, the periphery of said inner mold member being provided with alternate elevations and depressions and when concentrically positioned within said outer mold member confining a single substantially annular chamber between the latter and the elevations and depressions of said inner mold member, those face portions of said elevations which in the assembled position of said mold members face the adjacent inner surface of said outer mold member being provided with rigid ridge-like protrusions integral with said elevations, said protrusions extending substantially mid-way into said annular chamber and beyond the dedendum line thereof, said protrusions being substantially centrally located with respect to the face portions of said elevations, and extending substantially parallel to the central axis of said inner mold member and having their outermost edge portions rounded, said protrusions having a width considerably less than the width of the elevations pertaining thereto, said widths being measured in the direction transverse to the central axis of said inner mold member.

4. A mold for producing flexible belts with teeth and reinforcing inserts from pourable material, which comprises: an outer mold member, and an inner mold member arranged for concentric positioning in said outer mold member and for enclosure thereby, the periphery of said inner mold member being provided with alternate elevations and depressions and when concentrically positioned within said outer mold member confining a single substantially annular chamber between the latter and the elevations and depressions of said inner mold member, those surface portions of said elevations which in assembled position of said mold members face the adjacent inner surface of said outer mold member being provided with rigid ridge-like protrusions integral with said elevations, said protrusions extending substantially mid-way into said annular chamber and beyond the dedendum line thereof, said protrusions being substantially centrally located with respect to the face portions of said elevations, said protrusions being designed in a bead-like manner and extending in the direction of the central axis of said inner mold member, said ridge-like protrusions having a width considerably less than the width of the elevations pertaining thereto, said widths being measured in the direction transverse to the central axis of said inner mold member.

5. A mold for producing flexible belts with teeth and reinforcing inserts from pourable material, which comprises: an outer mold member, and an inner mold member arranged for concentric positioning in said outer mold member, the periphery of said inner mold member being provided with alternate elevations and depressions in conformity with the tooth spaces and teeth respectively of the belt to be produced and when inserted into said outer mold member confining a single substantially annular chamber between the latter and the elevations and depressions of said inner mold member, those face portions of said elevations which in assembled position of said mold members face the adjacent inner surface of said outer mold member being provided with rigid ridge-like protrusions integral with said elevations, said protrusions extending substantially mid-way into said annular chamber and beyond the dedendum line thereof, said protrusions being substantially centrally located with respect to the face portions of said elevations, and having their longitudinal extension in substantially the same direction as the central axis of said inner mold member, and having a width measured in a direction transverse to the direction of the central axis of said inner mold member considerably less than the width of the elevations pertaining thereto, said ridge-like protrusions having their outermost ridge portions along the longitudinal extension thereof provided with a plurality of notch-like grooves for receiving the reinforcing inserts for the belt to be poured.

References Cited in the file of this patent

UNITED STATES PATENTS

| | | |
|---|---|---|
| 1,898,031 | Carter | Feb. 21, 1933 |
| 2,066,964 | Desagnat | Jan. 5, 1937 |
| 2,507,852 | Case | May 16, 1950 |
| 2,532,080 | Benbow | Nov. 28, 1950 |
| 2,723,706 | Carter | Nov. 15, 1955 |

FOREIGN PATENTS

| | | |
|---|---|---|
| 65,831 | Norway | Mar. 1, 1943 |
| 744,907 | Great Britain | Feb. 15, 1956 |